Oct. 22, 1963   K. NOWAK   3,107,866
MOTOR VEHICLE HEADLAMP
Filed Jan. 24, 1962   2 Sheets-Sheet 1

Inventor
Karl Nowak

By Michael S. Striker
Attorney

Oct. 22, 1963  K. NOWAK  3,107,866
MOTOR VEHICLE HEADLAMP
Filed Jan. 24, 1962  2 Sheets-Sheet 2

Inventor
Karl Nowak

By Michael S. Striker
Attorney ary Patent Office 3,107,866
Patented Oct. 22, 1963

3,107,866
MOTOR VEHICLE HEADLAMP
Karl Nowak, 8 Mollardgasse, Vienna 6, Austria
Filed Jan. 24, 1962, Ser. No. 168,462
Claims priority, application Austria Jan. 25, 1961
20 Claims. (Cl. 240—41.25)

This invention relates to an anti-dazzle headlamp for motor vehicles.

Repeated attempts have already been made to suppress the dazzle of the main beam of a motor vehicle headlamp, but none of these earlier proposals has proved to be entirely satisfactory.

A primary object of the present invention is to provide a motor vehicle headlamp which comprises a combination of carefully matched features which cooperate to produce a main light beam which gives excellent illumination ahead of the vehicle without dazzling the drivers of oncoming vehicles.

Another object of the invention is to provide a motor vehicle headlamp capable of providing a main light beam and a shorter range auxiliary beam, neither of which beams dazzles the drivers of oncoming vehicles.

A further object of the invention is to provide a motor vehicle headlamp which produces an anti-dazzle main light beam and which also produces desirable diffuse light effects towards the nearside of the road.

Yet another object of the invention is to provide a motor vehicle headlamp bulb which, when mounted in a conventional headlamp reflector, is capable of providing an anti-dazzle main light beam.

These and other objects of the invention will become apparent from a consideration of the ensuing description given with reference to the accompanying drawings.

Figure 1:
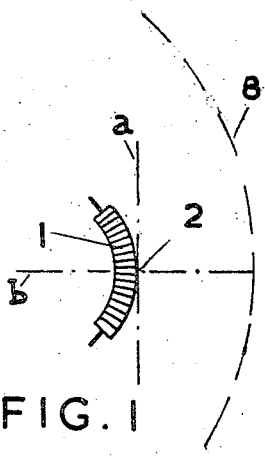
FIGURE 1 is a schematic view of the main filament of a headlamp for a motor vehicle.

Referring to FIGURE 1, a first desirable feature of a headlamp in accordance with the invention is that the filament for the main beam should be arched and be disposed so that its vertex lies as closely as possible to a vertical plane containing the focal point of the headlamp reflector, whereas all other parts of the filament are more remote from this plane and situated further away from the internal surface of the headlamp reflector. In FIGURE 1, the main beam filament is designated by the numeral 1 and the numeral 2 designates the focal point of the headlamp reflector 3. The vertex of the filament 1 is disposed so that a vertical plane $a$ passing through the focus 2 and lying at right angles to the axis $b$ of the reflector is tangential to the arched filament. Preferably, no part of the filament 1 lies in the space between the plane $a$ and the reflector 3.

Figure 2:
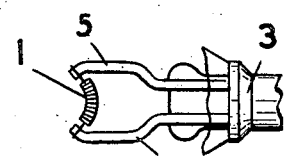
FIGURE 2 is a view, on a reduced scale, of the filament of FIGURE 1 showing one form of supporting electrodes for the filament.

The filament 1 is preferably supported between a pair of outwardly arched electrodes. This feature is illustrated in FIGURE 2 from which it will be seen that the filament 1 is supported by a pair of electrodes 4, 5 projecting from the base 3 of a bulb in conventional manner. After leaving the base 3 the electrodes 4, 5 first sweep outwardly, are then disposed parallel to one another and finally turn inwards at their free ends.

Figure 3:
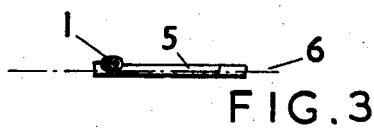
FIGURE 3 is a side view corresponding to FIGURE 2 showing a desirable positioning of the filament relative to a horizontal plane passing through the focus of the headlamp.

When the bulb is mounted in the reflector the lowermost point of the filament at its vertex should lie in the horizontal plane of symmetry of the headlamp. Preferably, the underside of the filament throughout its entire length lies in this plane. This is illustrated schematically in FIGURE 3 in which the numeral 6 designates the horizontal plane of symmetry of the headlamp. The filament 1 is disposed so that it appears to rest on the plane 6. It will also be observed that the centre lines of the supporting electrodes 4, 5 lie in the plane 6.

Figure 5:
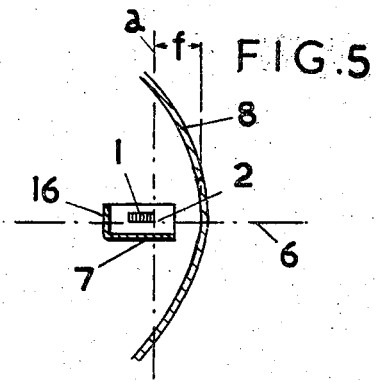
FIGURE 5 is a schematic sectional side view similar to FIGURE 4 showing the preferred disposition of the screen relative to the reflector of the headlamp.
Figure 4:
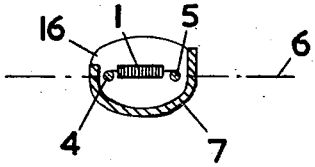
FIGURE 4 is an end view of the filament of FIGURE 2 showing a preferred disposition of a screen relative to the filament.

A headlamp in accordance with the invention comprises a back reflector or screen disposed below the main beam filament for intercepting the light emitted by the filament towards the bottom half of the headlamp reflector. Preferably, this screen is so contrived that two edges thereof, lying substantially parallel to the axis of the reflector, project above the horizontal plane of symmetry of the lamp, one edge being approximately level with the highest point of the filament, or slightly above this level, whereas the other edge preferably is more elevated. This feature is illustrated in FIGURE 4 which shows the filament 1 supported by its electrodes 4, 5 between the substantially vertical side limbs of a trough-shaped screen 7 of U-shaped cross-section. The upper edge of the left-hand limb of the screen 7 projects above the horizontal plane of symmetry 6 so as to be level with, or slightly above, the top of the filament 1, whereas the upper edge of the right-hand limb is more elevated. The light rays directed towards the left-hand half of the headlamp reflector pass over the left-hand edge of the screen and are therefore reflected toward the right-hand side of the road (i.e. the nearside for right-hand traffic), whereas the right-hand edge of the screen restricts to a greater extent the light reflected toward the left-hand side of the road. Naturally for left-hand traffic the screen 7 would have its left-hand limb higher than the right-hand limb. The screen 7 may have a blackened inner surface, although it is preferred that this surface should be bright. The forward end of the screen 7 is closed by a plate 16 to prevent the projection of light from the headlamp in a forward direction directly from the filament 1. Preferably the screen 7 extends beyond the focal point of the headlamp reflector towards the centre of the latter. This is shown in FIGURE 5, in which the focus 2 of the parabolic reflector 8 is at a distance $f$ from the centre of the reflector. The screen 7 extends longitudinally to the rear of the focus 2 to a point near the centre of the reflector.

Figure 6:
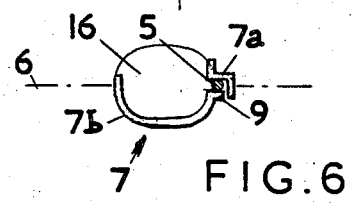
FIGURE 6 is an end view of a modified form of the screen of FIGURES 4 and 5.

Conveniently the screen which shields the main beam filament from the bottom half of the headlamp reflector is formed with one or more flanges below the horizontal plane of symmetry of the headlamp. Preferably, the screen is formed in two parts each provided with a flange, one of the supporting electrodes for the filament being positioned between the opposed flanges of the two parts. This is shown in FIGURE 6 from which it will be seen that the screen 7 is formed from two screen parts 7a and 7b. The trough-shaped screen part 7b has a flange 9 along the centre of which is disposed one of the supporting electrodes 5, the latter lying in the horizontal plane of symmetry 6 of the headlamp. The screen part 7a is a double flanged member which is welded to the electrode support 5. The upper elevated edge of the screen part 7a screens the light emitted towards the offside of the vehicle, as previously described with reference to FIGURE 4.

Figure 7:
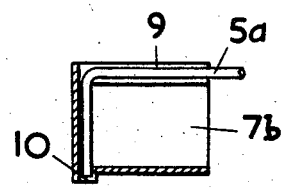
FIGURE 7 is a sectional plan view of a modified form of the screen of FIGURE 6.

An advantageous method of supporting the screen which shields the main beam filament from the bottom half of the headlamp reflector is to provide two sides of the screen with faces or vanes located in a common horizontal plane and to connect these faces or vanes to one of the filament supporting electrodes. The latter is then suitably bent to engage both the faces or vanes. This feature is shown in FIGURE 7, from which it will be seen that the supporting electrode 5a is provided with a right-angled bend. One limb of the electrode 5a engages the flange 9 of the screen part 7b, while the other limb of the electrode engages a small metal lug 10 on the opposite side of the screen part 7b. The screen part 7b is secured to the electrode 5a by three spot welds, one at the lug 10 and one at each end of the flange 9.

Figure 8:
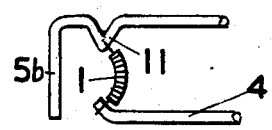
FIGURE 8 is a view similar to part of FIGURE 2 showing a modified form of filament supporting electrode.

When one of the supporting electrodes is bent to engage the two sides of the screen, as described with reference to FIGURE 7, it is preferred to form a V-shaped kink in the electrode for the purpose of receiving one end of the main beam filament. This feature is shown in FIGURE 8, in which the bent electrode 5b is provided with a V-shaped kink 11 projecting towards the other supporting electrode 4. The kink 11 lies in the same plane as the remainder of the electrode 5b and the electrode 4. The filament 1 is suspended between the kink 11 and the end of electrode 4.

Figure 9:
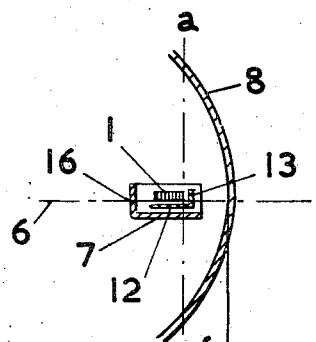
FIGURE 9 is a view similar to FIGURE 5 illustrating a supplementary screen.

One or more supplementary screening components may be provided for the purposes of (a) shielding the main beam filament from the centre of the lamp reflector and/or (b) extending horizontally below the main beam filament. These supplementary screening components may be combined to form a supplementary screen which is secured to the main screen or the components may be formed integrally with the main screen. FIGURE 9 shows such a supplementary screen comprising components 12 and 13. The component 12 is disposed horizontally closely below the filament 1, whilst the angled portion 13 screens the vertex of the filament 1 from the centre of the reflector 8. The screen portion 13 is conveniently located closely behind the focus 2. The supplementary screening components may be either black or bright, as in the case of the main screen 7.

Figure 10:
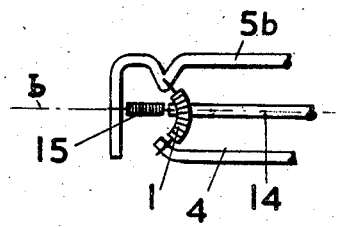
FIGURE 10 is a view similar to FIGURE 8 showing the mounting of a secondary filament.

A secondary filament is incorporated in the headlamp bulb for the purpose of providing a shorter range beam. Preferably one end of this secondary filament is located between the ends of the arched main filament. FIGURE 10 shows such a secondary filament 15 disposed in a vertical plane passing through the axis b of the headlamp reflector. One end of the filament 15 is connected to the electrode 5b whilst the other end is disposed between the ends of the filament 1 and is connected to an electrode wire 14 which passes underneath the filament 1 and rises up to the filament 15. Preferably at its end lying closer to the main filament 1 the secondary filament 15 is located in the same plane as the filament 1, whereas its other end is flush with the horizontal plane of symmetry of the lamp. The secondary filament 15 is then slightly downwardly inclined in the direction away from the filament 1. The main and secondary filaments can, of course, be switched on and off independently.

Figure 11:
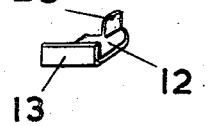
FIGURE 11 is a perspective view of a modified form of the supplementary screen of FIGURE 9.

If desired, the supplementary screen previously described may serve to support one end of the secondary filament. For this purpose it is convenient to provide the supplementary screen with an upwardly extending lug to which the secondary filament is attached. FIGURE 11 shows the supplementary screen of FIGURE 9 provided with such an upwardly extending lug 20. In this case the supplementary screen may be supported by the electrode wire 14 of FIGURE 10 so that it does not make electrical contact with the screen 7.

Figure 12:
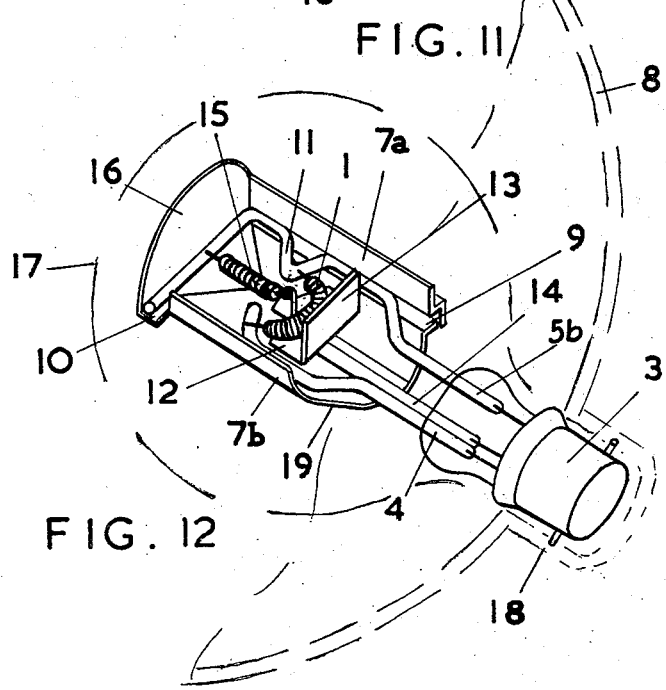
FIGURE 12 is a perspective view of part of a complete headlamp in accordance with the invention.

FIGURE 12 is a perspective view of the essential parts of a headlamp provided with a bulb incorporating the various features described above. In this FIGURE the glass envelope of the bulb is designated with the numeral 17. The base 3 of the lamp is provided with any conventional means, for example a bayonet type fitting, for the purpose of mounting the bulb at the centre of the reflector 8 with the various parts of the bulb orientated and disposed relative to the reflector 8 as described in detail above. In FIGURE 12 the bulb 3 is shown as being mounted in a socket 18 in the reflector 8.

Although FIGURE 12 shows a preferred embodiment of a headlamp in accordance with the invention, it will be appreciated that many modifications may be made to the headlamp without departing from the scope of the invention as defined in the appended claims.

When a headlamp in accordance with the invention is correctly adjusted it has the property of eliminating dazzle because it gives rise to a main beam which is parallel with the surface of the road but which has a sharply defined upper boundary. The headlamp reflector cannot cause dazzle anywhere above this limit, although the diffuse light in this zone will still be sufficiently strong for traffic signs to be readily recognised even at high speed. Diffuse light effects towards the nearside may be provided by asymmetrical conformations, for example the cut-away portion 19 of the screen 7 shown in FIGURE 12 or possibly an asymmetrical design of the supplementary screen members 12 and 13.

What I claim is:

1. A motor vehicle headlamp comprising a parabolic reflector, an electric lamp bulb having a base, interengaging means on the base of the bulb and the reflector for mounting the bulb in a predetermined angular position relative to a horizontal plane passing through the focus of said reflector and in a predetermined position lengthwise of the axis of the reflector, said bulb comprising first and second filament supporting electrodes secured in said base and projecting therefrom in said horizontal plane one on each side of said axis, said first electrode being arched away from said axis intermediate its ends, said second electrode comprising a first limb disposed substantially parallel to said axis and a second limb connected to the end of the first limb lying remote from said base, said second limb being disposed substantially parallel to a vertical plane passing through said focus at right angles to said axis, a kink in said first limb directed toward the first electrode opposite the free end of the latter, an arcuate main beam filament secured at one of its ends to the free end of the first electrode and at its other end to the kink in said second electrode, the filament being secured to said electrodes with its undersurface lying substantially in said horizontal plane and disposed symmetrically with respect to said axis with the centre of the outwardly curved surface of the filament located substantially at the focus of said reflector and the remainder of the filament lying on the side of said vertical plane lying remote from the reflector, a trough-shaped screen of U-shaped cross-section secured along one of its sides to the first limb of said second electrode and at its other side to the free end of the second limb of the second electrode, with the bottom of the trough below said filament and with its sides substantially vertically disposed parallel to, and substantially equidistant from, said axis, the uppermost edge of said other side of the screen being disposed approximately at the level of the uppermost surface of the main beam filament, and the uppermost edge of said one side of the screen being disposed at a higher level than the uppermost edge of said other side of the screen, a plate closing the end of said trough-shaped screen at its end remote from the reflector, a third electrode secured in said base and projecting therefrom under said main beam filament, a first supplementary screen member secured to said third electrode and disposed horizontally between said main beam filament and the bottom of the trough-shaped screen, a second supplementary screen member secured to the first mentioned supplementary screen member and disposed substantially vertically between said filament and the reflector, an upwardly directed lug formed integrally with said first supplementary screen member and spaced from the main beam filament on the side of the latter remote from the reflector, and a second electric filament connected between said lug and the second limb of said second electrode.

2. A motor vehicle headlamp according to claim 1, in which said one side of the trough-shaped screen comprises two flanged members welded respectively to the upper and lower surfaces of the first limb of the second electrode, and in which the other side of the trough-shaped screen comprises an outwardly projecting lug to which the free end of the second limb of the second electrode is welded.

3. A motor vehicle headlamp according to claim 1, in which the end of said trough-shaped screen remote from said plate is located between said vertical plane and the centre of the parabolic reflector.

4. A motor vehicle headlamp comprising a parabolic reflector, an electric lamp bulb having a base, interengaging means on the base of the bulb and the reflector for mounting the bulb in a predetermined angular position relative to a horizontal plane passing through the focus of said reflector and in a predetermined position lengthwise of the axis of the reflector, said bulb comprising first and second filament supporting electrodes secured in said base and projecting therefrom in said horizontal plane one on each side of said axis, said first electrode being arched away from said axis intermediate its ends, said second electrode comprising a first limb disposed substantially parallel to said axis and a second limb connected to the end of the first limb lying remote from said base, said second limb being disposed substantially parallel to a vertical plane passing through said focus at right angles to said axis, a kink in said first limb directed toward the first electrode opposite the free end of the latter, an arcuate main beam filament secured at one of its ends to the free end of the first electrode and at its other end to the kinked portion of the second electrode, the filament being secured to said electrodes with its undersurface lying substantially in said horizontal plane and disposed symmetrically with respect to said axis with the centre of the outwardly curved surface of the filament located substantially at the focus of said reflector and the remainder of the filament lying on the side of said vertical plane which is more remote from the reflector, a trough-shaped screen of U-shaped cross-section secured along one of its sides to the first limb of said second electrode and at its other side to the free end of the second limb of the second electrode with the bottom of the trough below said filament and with its sides substantially vertically disposed parallel to, and substantially equidistant from, said axis, the uppermost edge of said other side of the screen being disposed approximately at the level of the uppermost surface of the main beam filament, and the uppermost edge of said one side of the screen being disposed at a higher level than the uppermost edge of said other side of the screen, a plate closing the end of said trough-shaped screen at its end remote from the reflector, a third electrode secured in said base and projecting therefrom under said main beam filament, and a second electric filament connected between said third electrode and the second limb of said second electrode.

5. A motor vehicle headlamp according to claim 4, in which said third electrode curves upwardly to a point encircled by the arch of the main beam filament and lying approximately at the level of the top surface of the main filament, said second filament being connected to the third electrode at said point, whereby the second filament slopes downwardly in the direction from the third electrode to the second limb of the second electrode.

6. A motor vehicle headlamp according to claim 5, in which said second filament is disposed in a vertical plane passing through the axis of the reflector.

7. A motor vehicle headlamp comprising a parabolic reflector, an electric lamp bulb having a base, interengaging means on the base of the bulb and the reflector for mounting the bulb in a predetermined angular position relative to a horizontal plane passing through the focus of said reflector and in a predetermined position lengthwise of the axis of the reflector, said bulb comprising first and second filament supporting electrodes secured in said base and projecting therefrom in said horizontal plane one on each side of said axis, one of said electrodes comprising a first limb disposed substantially parallel to said axis and a second limb connected to the end of said first limb lying remote from said base, said second limb being disposed substantially parallel to a vertical plane passing through said focus at right angles to said axis, an arcuate main beam filament secured at one of its ends to the first limb of said one electrode and at its other end to the free end of the other electrode, the filament being secured to said electrodes with its undersurface lying substantially in said horizontal plane and disposed symmetrically with respect to said axis with the centre of the outwardly curved surface of the filament located substantially at the focus of said reflector and the remainder of the filament lying on the side of said vertical plane which is more remote from the reflector, a trough-shaped screen of U-shaped cross-section secured along one of its sides to the first limb of said one electrode and at its other side to the free end of the second limb of said one electrode with the bottom of the trough below said filament and with its sides substantially vertically disposed parallel to, and substantially equidistant from, said axis, the uppermost edge of said other side of the screen being disposed approximately at the level of the uppermost surface of the main beam filament, and the uppermost edge of said one side of the screen being disposed at a higher level than the uppermost edge of said other side of the screen, a plate closing the end of said trough-shaped screen at its end remote from the reflector, a third electrode secured in said base and projecting therefrom under said main beam filament, and a second electric filament connected between said third electrode and the second limb of said one electrode.

8. A motor vehicle headlamp according to claim 7, in which the end of said trough-shaped screen remote from said plate is located between said vertical plane and the centre of the parabolic reflector.

9. A motor vehicle headlamp comprising a parabolic reflector, an electric lamp bulb having a base, interengaging means on the base of the bulb and the reflector for mounting the bulb in a predetermined angular position relative to a horizontal plane passing through the focus of said reflector and in a predetermined position lengthwise of the axis of the reflector, said bulb comprising first and second filament supporting electrodes secured in said base and projecting therefrom in said horizontal plane one on each side of said axis, both electrodes being outwardly arched with respect to said axis, an arcuate main beam filament secured at its ends to the free ends of said electrodes with its undersurface lying substantially in said horizontal plane and disposed symmetrically with respect to said axis with the centre of the outwardly curved surface of the filament located substantially at the focus of said reflector and the remainder of the filament lying on the side of said vertical plane which is more remote from the reflector, a trough-shaped screen of U-shaped cross-section secured along one of its sides to one of said electrodes with the bottom of the trough below said filament and with its sides substantially vertically disposed parallel to, and substantially equidistant from, said axis, the uppermost edge of one side of the screen being disposed approximately at the level of the uppermost surface of the filament and the uppermost edge of the other side of the screen being disposed at a higher level, and a plate closing the end of said trough-shaped screen at its end remote from the reflector.

10. A motor vehicle headlamp according to claim 9, in which the end of said trough-shaped screen remote from said plate is located between said vertical plane and the centre of the parabolic reflector.

11. A motor vehicle headlamp according to claim 9, comprising a supplementary screen secured to said trough-shaped screen, said supplementary screen comprising a first member disposed horizontally between said filament and the bottom of the trough-shaped screen and a second member disposed substantially vertically between said filament and the reflector.

12. A motor vehicle headlamp comprising a parabolic reflector, an electric lamp bulb having a base, interengaging means on the base of the bulb and the reflector for mounting the bulb in a predetermined angular position relative to a horizontal plane passing through the focus of said reflector and in a predetermined position lengthwise of the axis of the reflector, said bulb comprising two filament supporting electrodes secured in said base and projecting therefrom in said horizontal plane one on each side of said axis, an arcuate electrical filament secured at its ends to the free ends of said electrodes with its undersurface lying substantially in said horizontal plane and disposed substantially symmetrically with respect to said axis with the centre of the outwardly curved surface of the filament located substantially at the focus of said reflector and the remainder of the filament lying on the side of said vertical plane which is more remote from the reflector, a trough-shaped screen secured along one of its sides to one of said electrodes with the bottom of the trough below said filament and with its sides disposed parallel to, and substantially equidistant from, said axis, the uppermost edge of one side of the screen being disposed horizontally at the level of the uppermost surface of the filament and the uppermost edge of the other side of the screen being disposed horizontally at a higher level, and a plate closing the end of said screen at its end remote from the reflector.

13. A motor vehicle headlamp according to claim 12, in which a third electrode secured in said base projects from the base underneath said filament and serves to supply a second filament disposed between the first mentioned filament and said plate.

14. A motor vehicle headlamp according to claim 13, comprising a supplementary screen secured to said third electrode, said supplementary screen comprising a first screening member disposed horizontally between said filament and the bottom of the trough-shaped screen and a second screening member disposed substantially vertically between said filament and the reflector.

15. A headlamp bulb comprising a cylindrical base, two filament supporting electrodes projecting from said base in a plane passing through the axis of the cylindrical base, the electrodes being disposed one on each side of said axis, an arcuate electrical filament secured at its ends to the free ends of said electrodes with its undersurface lying substantially in said plane and disposed substantially symmetrically with respect to said axis with the centre of the outwardly curved surface of the filament lying nearest to said base, a trough-shaped screen secured along one of its sides to one of said electrodes with the sides of the trough disposed substantially parallel to, and substantially equidistant from, said axis and each side of the trough disposed partly above and partly below said plane, the trough bottom interconnecting said sides below said plane beneath the filament, the edge of one side of the trough lying above said plane being disposed substantially parallel to said axis at a distance from said plane substantially equal to the thickness of said filament and the edge of the other side of the trough lying above said plane and being disposed substantially parallel to said axis at a distance from said plane which is greater than the thickness of said filament, and a plate closing the end of the trough at its end remote from said base.

16. A headlamp bulb according to claim 15, in which the end of the trough-shaped screen remote from said plate is disposed closer to the base of the bulb than said filament.

17. A headlamp bulb according to claim 15, in which a first one of said electrodes is arched away from said axis intermediate its ends, in which the second one of said electrodes comprises a first limb disposed substantially parallel to said axis and a second limb connected to the end of the first limb lying remote from said base, said second limb being disposed across said axis substantially at right angles thereto, and in which a kink is formed in said first limb directed toward said first electrode opposite to the free end of the latter, said filament being supported between the free end of the first electrode and the kink in the first limb of the second electrode.

18. A headlamp bulb according to claim 17, in which one side of said screen is welded to the first limb of the second electrode and the other side of the screen is welded to the free end of the second limb of the second electrode.

19. A headlamp bulb according to claim 18, comprising a third electrode secured in said base and projecting therefrom between the trough bottom and the filament, and a second filament disposed substantially parallel to said axis and connected between the free end of said third electrode and the second limb of the second electrode.

20. A headlamp bulb according to claim 19, comprising a first supplementary screen member secured to said third electrode and disposed parallel to said plane between the arcuate filament and the trough bottom, and a second supplementary screen member secured to the first supplementary screen member and disposed between said arcuate filament and the base of the bulb.

References Cited in the file of this patent

UNITED STATES PATENTS

| | | |
|---|---|---|
| 2,020,130 | Astor | Nov. 5, 1935 |
| 2,912,610 | Verbeek | Nov. 10, 1959 |

FOREIGN PATENTS

| | | |
|---|---|---|
| 213,223 | Australia | Aug. 18, 1955 |

OTHER REFERENCES

German application, 1,038,650, Sept. 11, 1958.